(No Model.)

L. BOYER.
APPARATUS FOR THE TREATMENT OF CANE JUICE BY FILTRATION.

No. 453,735. Patented June 9, 1891.

WITNESSES:

INVENTOR:
L. Boyer
BY Munn & Co.
ATTORNEYS

UNITED STATES PATENT OFFICE.

LÉON BOYER, OF NEW ORLEANS, LOUISIANA, ASSIGNOR TO ERNEST F. HERWIG, OF SAME PLACE.

APPARATUS FOR THE TREATMENT OF CANE-JUICE BY FILTRATION.

SPECIFICATION forming part of Letters Patent No. 453,735, dated June 9, 1891.

Application filed July 8, 1890. Serial No. 358,041. (No model.)

*To all whom it may concern:*

Be it known that I, LÉON BOYER, of New Orleans, in the parish of Orleans and State of Louisiana, have invented a new and useful Improvement in Apparatus for the Treatment of Cane-Juice by Filtration, of which the following is a full, clear, and exact description.

My invention relates to an improved apparatus for treating cane-juice by filtration; and the invention consists in the peculiar construction and combination of parts, as hereinafter fully described, and pointed out in the claims.

Reference is to be had to the accompanying drawings, forming a part of this specification, in which similar letters of reference indicate corresponding parts in both the figures.

Figure 1:
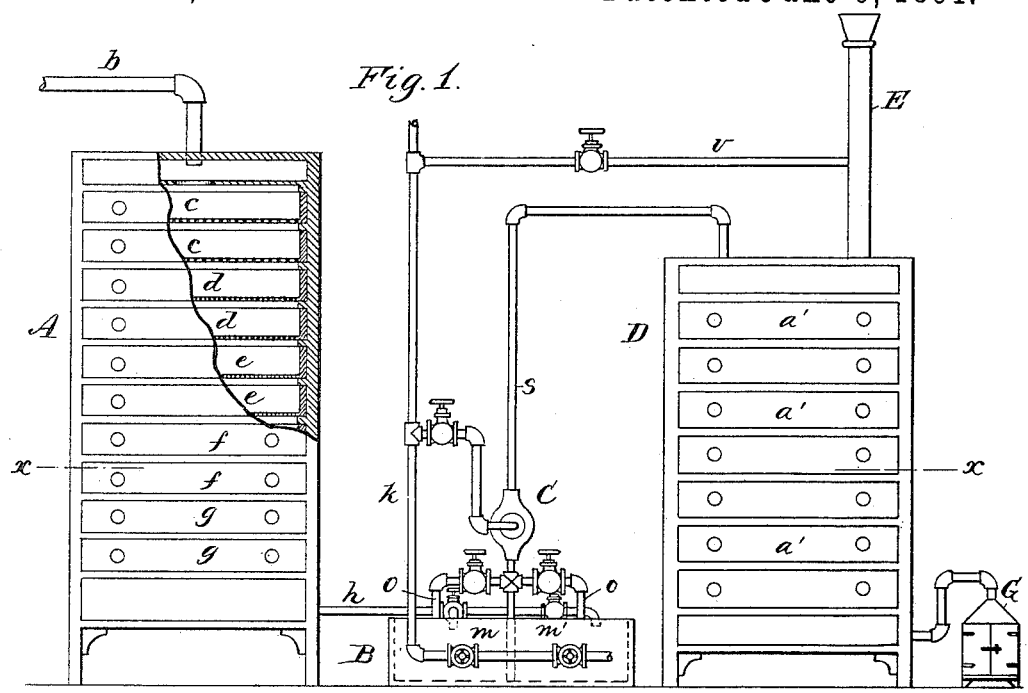
Figure 2:
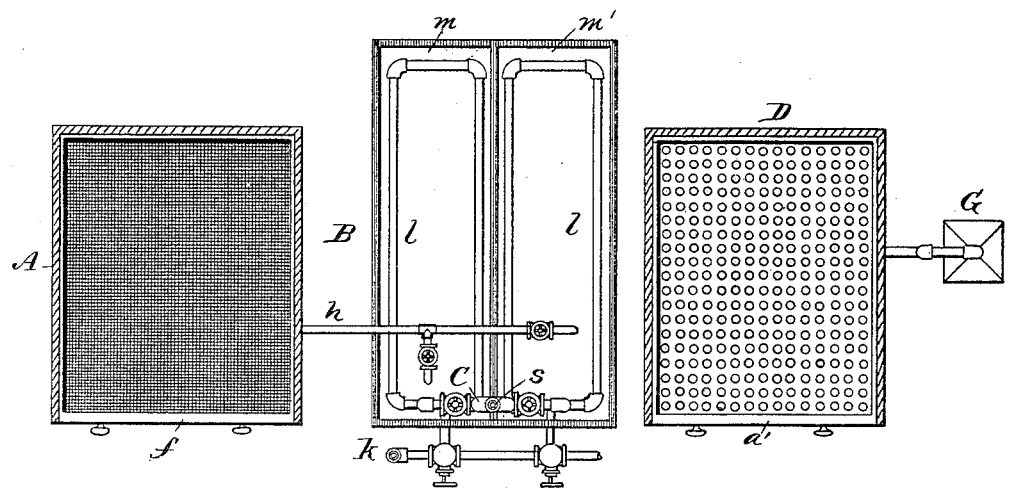

Figure 1 represents a partly-broken or sectional view in elevation of my apparatus, and Fig. 2 is a horizontal section of the same on the line $x\,x$ of Fig. 1.

A indicates the primary filter in the form of an upright strainer-box, into the top of which the cane-juice as it comes from the crushing-mill is passed by any suitable duct, such as a trough or pipe $b$. This upright filter or strainer-box A is of proper proportions and capacity to suit the mill that supplies it, and is fitted with several sets (here shown as five pairs or sets) of filtering or straining drawers $c\,c, d\,d, e\,e, f f,$ and $g\,g$. Each set of drawers is made up of at least two drawers, one below the other, and each succeeding pair or set of drawers has the bottom or strainer of each of its drawers of like mesh, but each succeeding pair or set in a downward direction has strainers of a finer mesh than the set or pair of drawers next above it. Thus the top pair or set of drawers $c\,c$ has coarse strainer-bottoms, and when the upper one of these drawers is full of trash, as left by the juice percolating through it, said drawer is removed and cleaned and the other or lower drawer of said set is allowed to remain and keep up the filtering action till the upper or first drawer, having been emptied, is replaced, after which the second drawer, which by this time has accumulated or filled with trash, is in its turn emptied or cleaned, and so on alternately for each drawer in the set. The next set $d\,d$ of two drawers, which have strainer-bottoms of finer mesh than the set $c\,c$, are similarly handled and used, each drawer serving to continue the filtration while the other one is being emptied or cleaned, and so on for the next and each succeeding set of strainer-drawers in a downward direction, till the lowermost set of all is reached, which lowermost set has strainer-bottoms of the finest grade of mesh or perforations in the whole series of sets, the meshes of the several succeeding sets being regularly graduated from coarse to fine in a downward direction, but, as hereinbefore observed, each drawer of the same set being of like mesh. By this graduation and repetition of strainer-drawers of like mesh in the same set the liability of obstruction is reduced or obviated and cleaning of the filter or graduated strainer-box is divided and facilitated, whereby a perfect and continuous first filtration of the juice is effected.

From the bottom of the strainer-box A the juice is conducted, as by a pipe $h$, over and into a clarifying-pan B, the strainer-box A having a suitable elevation for the purpose. The clarifying-pan B is or may be an ordinary clarifying-pan, designed not for the purpose of evaporating the juice, but the same only being heated to a clarifying degree of temperature. This pan is provided with the usual steam heating-pipes $k$ and $l$, provided with cocks and leading into the pan, and separately considered forms no part of my invention. It is divided into two compartments $m$ and $m'$ to facilitate cleaning—as, for instance, one of said compartments at a time—and is provided with a pump C, which for my purpose is preferably a siphon one, $o\,o$ being the juice-supply pipes having cocks from the two compartments $m\,m'$ of the pan, and $s$ being the delivery-pipe of the pump.

The inlet-pipe $h$ for the juice to the clarifying-pan is furnished with separate nozzles or outlets and cocks to control the supply to either compartment $m\,m'$ of the pan. The usual or any suitable chemicals—such as lime or sulphur—are used during the treatment of the juice to effect clarification.

The juice-delivering pipe $s$ of the pump conducts the clarified juice into the top of a second strainer-box or filter D, which is provided with a draft-pipe or chimney E, that is connected, as by a branch pipe $v$, controlled by a cock, with the steam-supply pipe $k$ to the pan for the purpose of quickening the draft where sulphurous gas is used in the treatment of the juice within the second strainer-box D to correct acidity or prevent the shavings, with which said strainer-box is charged, from fermenting.

The second strainer-box or filter D is also an upright one, and is fitted with any number of drawers $a'$ of suitable size arranged one above the other and having perforated bottoms. These drawers $a'$ are designed to contain the wood shavings or other suitable filtering material, and each drawer being separate it can be removed and the filtering material in it be washed or replaced, when required, without interfering with the filtering process in the remaining drawers.

To prevent acidity or fermentation, I propose to use sulphurous gases, which may be generated in a retort G, connected with the strainer-box D below, and from which said gases may be forced or sucked up through the filtering material in the drawers $a'$ by the draft-pipe or chimney E, aided by the steam-jet pipe $v$. The second strainer-box D, however, is not restricted to this use of sulphurous gases, as it may be found more convenient to use a neutralizing agent in liquid form and pass the same from the top of the strainer-box down through the shavings or filtering material in the drawers $a'$.

Now it will be seen by the apparatus I have described that the juice is manipulated or treated in three separate ways—that is, first in the primary strainer-box, then in the clarifying-pan, and ultimately in the finishing or second strainer box. This multiple treatment will be found greatly superior to other methods or means of depriving cane-juice of all foreign matter. Of course there is nothing new in the abstract in repeatedly filtering or in using strainers of different-sized mesh; but in my case there is a continuous action throughout the apparatus and different and superior results are produced. Ordinarily, or under former methods, the filtering depends upon the arrangement of the filter for convenience, speed or capacity, and upon the fineness of the mesh or size of the filtering-apertures, but not for separating the inherent foreign matter held in solution in the juice and refiltering afterward. This inherent matter cannot be taken out of the juice without coagulation by chemical means and by the application of heat. Under former methods it has been customary to filter the juice as may be, and then to pass it into the clarifying-pan, and afterward to skim it and pass it into a first kettle, usually called the "grand kettle," where it is skimmed again, and so for any number of kettles or pans in succession, the heat increasing in each pan, so that in case the juice should be dirty and contain much gummy foreign matter the scum is thrown up by the heat faster than it can be skimmed off, and a quantity of dirt is cooked into or incorporated with the sugar. This is a very deficient way of clarifying which my improved method avoids. Thus I first remove all detached coarse matter by a system of strainers in a most convenient manner, and by using the heating clarifying-pan I thoroughly separate by chemical means the inherent gummy matter, and so prepare the juice that after going through the second or last filter a perfect clarification is produced and the juice is practically so free from all foreign matter that the remaining process of skimming is greatly facilitated and a superior quality of sugar produced.

By my improved apparatus the juice can be made so clean that the custom of using lime to neutralize the acid in cane-juice practiced by sugar-manufacturers can, owing to the purity of the juice obtained, be so simplified as to require but very little skill or knowledge to carry it out, whereas it has heretofore required much attention and caregul calculation.

Having thus fully described my invention, I claim as new and desire to secure by Letters Patent—

1. In apparatus for the treatment of cane-juice by filtration, a primary strainer-box or filter composed of a series of strainer-drawers arranged in sets one below the other, the drawers in each set being of like mesh with one another, but the several sets being of successively finer mesh in a downward direction, essentially as and for the purpose herein described.

2. In apparatus for the treatment of cane-juice by filtration, the combination of the strainer-box or filter A, the clarifying-pan B, connected therewith, the second strainer-box or filter D, a juice-supply duct connecting the clarifying-pan with the filter D, the draft-pipe or chimney E, applied to said second filter, the steam-jet pipe $v$, and the sulphur-retort G, substantially as shown and described.

LÉON BOYER.

Witnesses:
A. B. HARRIS,
C. T. HODGES.